M. D. SHILLING.
SHOCK ABSORBER FOR VEHICLE SPRINGS.
APPLICATION FILED FEB. 10, 1908.

921,471.

Patented May 11, 1909.
2 SHEETS—SHEET 1.

M. D. SHILLING.
SHOCK ABSORBER FOR VEHICLE SPRINGS.
APPLICATION FILED FEB. 10, 1908.
921,471.
Patented May 11, 1909.
2 SHEETS—SHEET 2.
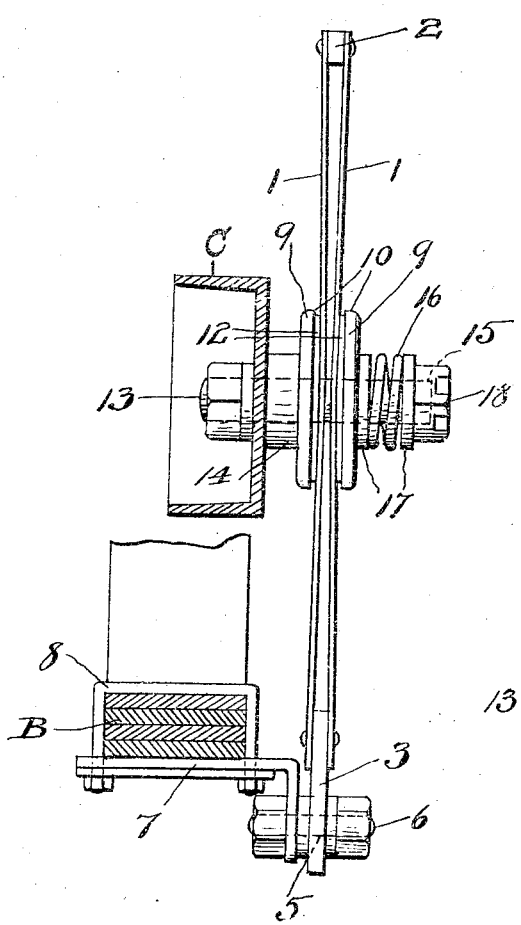

UNITED STATES PATENT OFFICE.

MONT D. SHILLING, OF NEW CASTLE, PENNSYLVANIA.

SHOCK-ABSORBER FOR VEHICLE-SPRINGS.

No. 921,471.   Specification of Letters Patent.   Patented May 11, 1909.

Application filed February 10, 1908. Serial No. 415,185.

*To all whom it may concern:*

Be it known that I, MONT D. SHILLING, a citizen of the United States, residing at New Castle, in the county of Lawrence and State of Pennsylvania, have invented certain new and useful Improvements in Shock-Absorbers for Vehicle-Springs, of which the following is a specification.

My invention relates to devices for absorbing the shock on vehicle springs in passing over roughnesses and obstructions in the road and has for its object the provision of a device that is effective in operation, simple in construction, reasonable in cost of manufacture, and that can be applied to vehicle springs of different types.

The construction and operation of my invention will be described in detail hereinafter and illustrated in the accompanying drawings in which—

Figure 1:
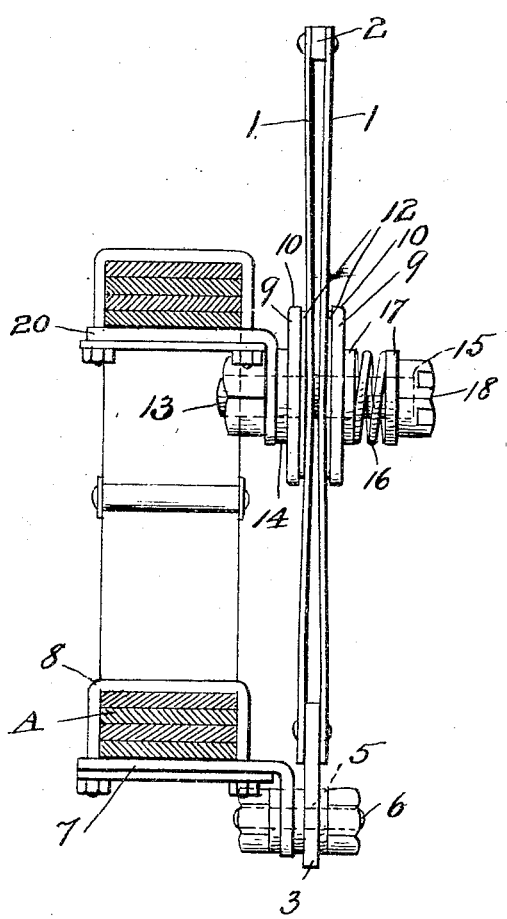
Figure 3:
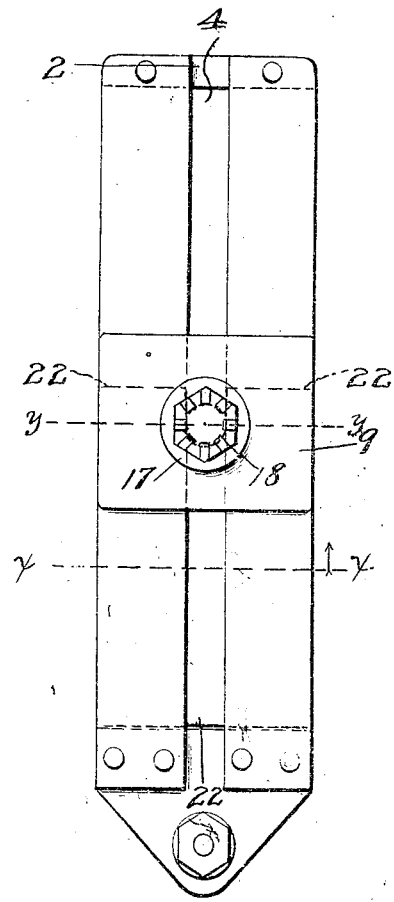

Figure 1 is a view showing my improved shock absorber attached to an elliptic spring, Fig. 2, a view showing it applied to a vehicle having semi-elliptic springs, Fig. 3, a side view of the absorber showing also the plate used with the absorber to support the vehicle in case of a broken spring, Fig. 4, a cross section on the line $x$—$x$ of Fig. 3, and Fig. 5, a cross section on the line $y$—$y$.

In the drawings similar reference characters indicate corresponding parts throughout the several views.

My improved shock absorber consists of front steel plates 1 secured in pairs on the two sides of distance plates 2 and 3 and having their adjacent edges spaced apart and forming openings or slots 4 therebetween, the openings or slots between the two sets of plates being opposite one another. The distance plate 3 is provided with hole 5 to receive a bolt 6 in securing it to an angle plate 7 secured to the lower half of the elliptic spring A shown in Fig. 1 or to the semi-elliptic spring B shown in Fig. 2 by means of clips 8.

The friction plates consist of metal plates 9 having their edges bent upwardly as shown at 10 to form recesses 11 to receive friction pads 12 that engage the outer surface of plates 1. The friction plates are held against the plates 1 by means of a bolt 13 having a shoulder 14 to seat against one of the plates 9 and a threaded end 15 that is inserted through holes $10^a$ in said plates and $12^a$ in the friction pads.

16 represents a coil spring interposed between two washers 17 and mounted on the threaded end 15 between the nut 18 and the adjacent friction plate, the purpose of said spring being to allow some play to the action of the friction plates after the resistance is adjusted by means of nut 18. The other end of bolt 13 is also threaded as shown at 19 so that it may be secured to the upper half of spring A in Fig. 1 by means of angle plate 20, or directly to the frame C of the vehicle as shown in Fig. 2.

21 indicates projections on flanges 10 to engage slots 4 to prevent the plates 9 from turning.

It will be understood that by tightening adjusting nut 18 the plates 9 are drawn toward one another so as to spring the plates 1 inwardly. When properly adjusted the friction plates move freely on the middle of the plates 1, but should an obstruction be encountered so that the friction plates approach the ends of plates 1 the friction is increased because of the fixed distance between the sides of the plates at their ends and the rebound from the obstruction is gradually and efficiently absorbed.

In case of breakage of a spring the adjusting nut 18 may be loosened to allow the plates 1 to relax and then a plate 22 is placed between the plates 1 and tightening nut 18 so as to securely clamp the parts together. This will support the vehicle until the spring can be repaired.

Having thus described my invention what I claim is—

1. In a shock absorber, spring plates secured on each side of distance plates, friction plates engaging said spring plates, and means to adjust said friction plates so as to flex said spring plates toward one another and reduce the distance between the adjacent sides of the plates intermediate of the distance plates to less than the thickness thereof.

2. In a shock absorber, spring plates secured on each side of distance plates, friction plates engaging the outer surfaces of said spring plates, and spring controlled means to adjust the friction plates so as to flex the spring plates toward one another and reduce the distance between the adjacent sides of the plates intermediate of the distance plates to less than the thickness thereof.

3. In a shock absorber, spring plates secured in pairs on the two sides of distance plates and spaced apart to form a slot between their adjacent edges, friction plates engaging the outer surfaces of said spring plates, and a holding device for actuating said friction plates to hold them in engagement with the spring plates, said holding devices slidably mounted in the slot between said spring plates.

4. In a shock absorber, spring plates secured in pairs on the two sides of distance plates and spaced apart to form a slot between their adjacent edges, friction plates engaging the outer surfaces of said spring plates, and a spring actuated device for holding said friction plates in engagement with the spring plates, said holding devices slidably mounted in the slot between the plates.

5 In a shock absorber, spring plates secured in pairs on the two sides of distance plates and spaced apart to form a slot between their adjacent edges, friction plates engaging the outer surfaces of said spring plates, a bolt engaging said friction plates and slidably mounted in the slot between the spring plates, a nut on the end of the bolt, and a coil spring mounted on the bolt between the nut and adjacent friction plate.

In testimony whereof I hereto affix my signature in the presence of two witnesses.

MONT D. SHILLING.

Witnesses:
H. K. GREGORY,
EARL W. DEVLIN.